(12) United States Patent
Kobayashi

(10) Patent No.: US 6,798,575 B2
(45) Date of Patent: Sep. 28, 2004

(54) SCANNING TYPE DISPLAY OPTICAL SYSTEM, SCANNING IMAGE DISPLAY APPARATUS, AND IMAGE DISPLAY SYSTEM

(75) Inventor: Shuichi Kobayashi, Kanagawa (JP)

(73) Assignee: Canon Kabushiki Kaisha (JP)

( * ) Notice: Subject to any disclaimer, the term of this patent is extended or adjusted under 35 U.S.C. 154(b) by 16 days.

(21) Appl. No.: 10/404,527

(22) Filed: Apr. 1, 2003

(65) Prior Publication Data

US 2003/0189742 A1 Oct. 9, 2003

(30) Foreign Application Priority Data

Apr. 5, 2002 (JP) ........................................ 2002-104405

(51) Int. Cl.[7] .......................... G02B 27/10; G02B 28/08
(52) U.S. Cl. ...................................... 359/618; 359/202
(58) Field of Search ................................ 359/202, 618, 359/629, 201, 204

(56) References Cited

U.S. PATENT DOCUMENTS 5,027,359 A * 6/1991 Leger et al. ................. 372/18
5,892,556 A * 4/1999 Deter .......................... 348/739
6,542,245 B2 * 4/2003 Toida .......................... 356/480

FOREIGN PATENT DOCUMENTS

| JP | 2-25831 | 1/1990 |
| JP | 7-168123 | 7/1995 |
| JP | 2001-194617 | 7/2001 |

* cited by examiner

Primary Examiner—Ricky Mack
(74) Attorney, Agent, or Firm—Morgan & Finnegan, LLP

(57) ABSTRACT

This application discloses a scanning type display optical system that has a small number of parts and is easily miniaturized. A scanning type display optical system according to the present invention includes a plurality of light sources emitting light having wavelength regions mutually different, a light combining element combining the plurality of light emitted from the light sources, and a scanning optical system scanning light, combined by the light combining element, on a scan surface. Here, the light combining element is a diffraction optical element.

7 Claims, 15 Drawing Sheets

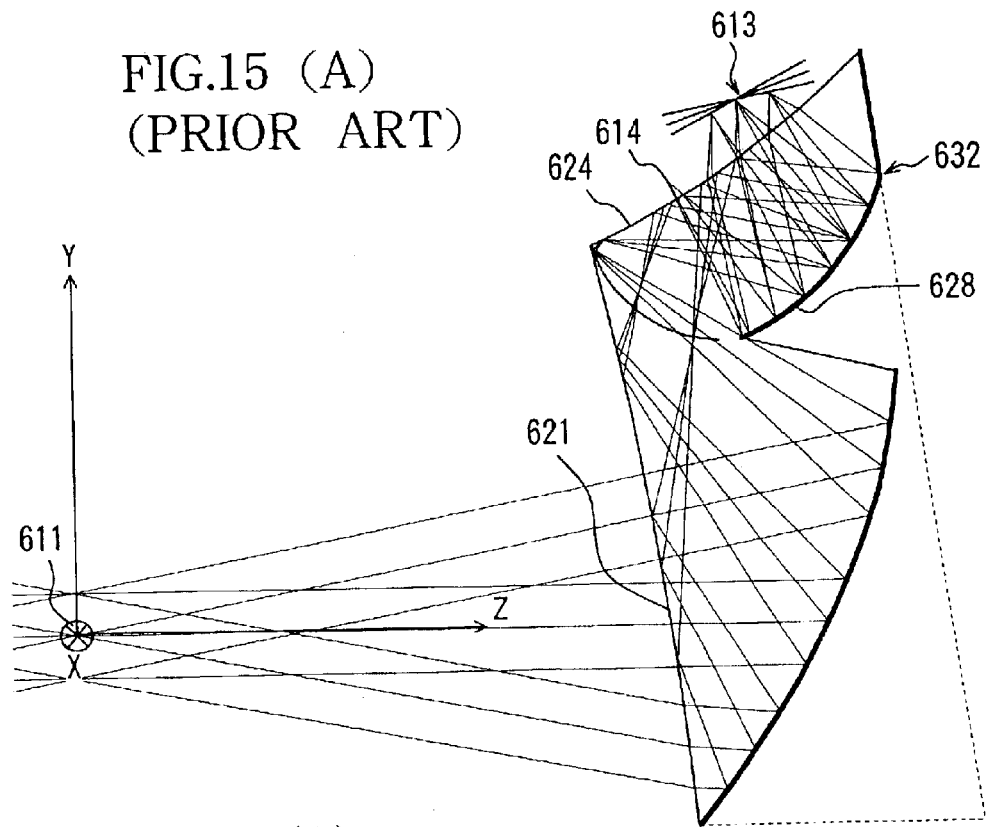
FIG.15 (A) (PRIOR ART)
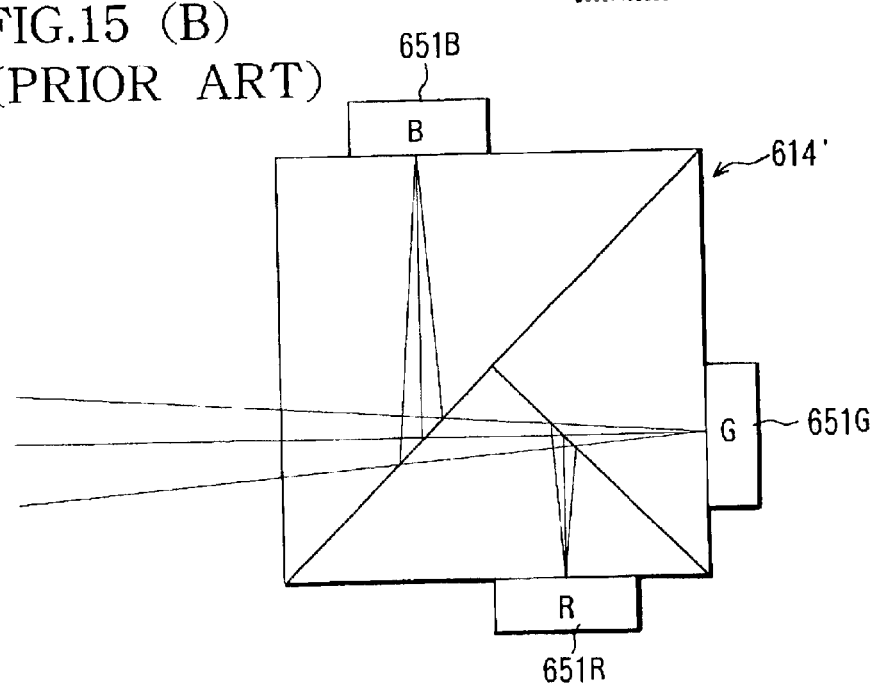
FIG.15 (B) (PRIOR ART)

SCANNING TYPE DISPLAY OPTICAL SYSTEM, SCANNING IMAGE DISPLAY APPARATUS, AND IMAGE DISPLAY SYSTEM

BACKGROUND OF THE INVENTION

1. Field of the Invention

The present invention relates to a scanning type display optical system displaying an image by scanning light.

2. Description of the Related Art

A lot of image display apparatuses each apparatus, modulates light by a two-dimensional light modulation device such as a liquid crystal panel, and enlarges and projects the modulated light transmitted through or reflected by the light modulation device on a screen through an optical system, are proposed.

On the other hand, scanning image display apparatuses which displays an image on a screen by scanning a light beam or light beams at high speed, is proposed.

This scanning type image display apparatus can display an image with high color reproducibility in high resolution by using light sources with high directivity such as lasers and selecting appropriate wavelength regions of light beams emitted from the light sources.

Japanese Patent Laid-Open No. 1990-25831, and Japanese Patent Laid-Open No. 1995-168123, propose their specific structure.

In addition, as a scanning type image display apparatus, as proposed in Japanese Patent Laid-Open No. 2001-194617, there is an apparatus that makes an image observable by scanning a light beam in observer's eyes (his/her retinas).

FIG. 13 shows the structure of the scanning image type display apparatus proposed in the above-described Japanese Patent Laid-Open No. 1995-168123. In this figure, light beams 412, 422, and 432 that have three different wavelength regions and are emitted from rare gas laser sources 410, 420, and 430 are modulated respectively by modulators 414, 424, and 434, and are combined by dichroic mirrors 416, and 426. A combined beam 440 is scanned on a screen 454 in a two-dimensional direction by optical scanning mirrors 444 and 446, and forms a color image on the screen 454.

FIG. 14 shows the structure of an apparatus proposed in the above-described Japanese Patent Laid-Open No. 1990-25831. In this figure, reference numeral 510 shows a He—Ne laser light source and reference numeral 520 shows an Ar laser light source. A light beam in a red system from the He—Ne laser source 510 is modulated by an optical modulator 513. In addition, a light beam from the Ar laser light source 520 is split into a green component and a blue component by a beam splitting element 522. And the green and blue components are modulated respectively by different optical modulators 525 and 533.

Thereafter, these three color beams are combined by the dichroic mirrors 528 and 536, and the combined beam enters into a scanning optical system 504. The scanning optical system 504 scans the combined beam two-dimensionally by optical scanning mirrors 542 and 545, and displays a color image on a screen 547.

FIGS. 15(A) and 15(B) show the structure of an optical system that is applied to a head-mounted image display apparatus, proposed in Japanese Patent Laid-Open No. 2001-194617. FIG. 15(A) shows the outline of the optical system, where a light flux from a light source 614 is reflected on a reflecting surface 628 of a prismatic optical system 632 and enters into a scanning mirror 613 after passing through a surface 624 of the prismatic optical system. The scanning mirror 613 scans the incident light. The scanned light enters into the prismatic optical system 632 again, and is reflected on a plurality of surfaces to be emitted from a surface 621 to observer's pupils 611.

In addition, though the light source 614 is shown like one light source in FIG. 15(A), a dichroic prism 614' that is a color combining element shown in FIG. 15(B) is actually arranged. Owing to this, three colors of light from light sources 651R, 651G, and 651B corresponding to red, green, and blue are combined by the dichroic prism 614', and the combined light is emitted toward the prismatic optical system 632.

Nevertheless, since each color combining system in the optical systems proposed in the above-described Japanese Patent Laid-Open No. 1995-168123 and Japanese Patent Laid-Open No. 1990-25831 is formed by combining and arranging a plurality of dichroic mirrors, an optical path route becomes large so that the entire optical system is enlarged. In addition, structure of the color combining system becomes complex since there are a lot of parts.

In addition, though it is possible to miniaturize the optical system, proposed in the above-described Japanese Patent Laid-Open No. 2001-194617, in some measure by using a dichroic prism, in general, the dichroic prism is expensive. Furthermore, since three color light beams are combined by reflective and transmissive actions to a plurality of dichroic surfaces, a shape of the prism becomes complex and it becomes easy to cause displacement of the color light beams on a scan surface.

BRIEF SUMMARY OF THE INVENTION

The present invention aims to provide a scanning type display optical system that can reduce the number of parts and can achieve miniaturization.

In order to achieve the above-described object, the scanning type display optical system according to the present invention includes a plurality of light sources emitting light having wavelength regions mutually different, a light combining element combining the light from the plurality of light sources, and a scanning optical system scanning the light, combined by the light combining element on a scan surface. Then, it is made that the light combining element is a diffraction optical element.

The features of the present invention will become clear by the explanation of the following specific embodiments with referring to drawings.

BRIEF DESCRIPTION OF THE DRAWINGS

FIGS. 15(A) and 15(B) are drawings showing still another conventional scanning type image display apparatus.

DETAILED DESCRIPTION OF PREFERRED EMBODIMENTS

Hereafter, preferable embodiments of the present invention will be explained with referring to drawings.

Embodiment 1

Figure 1:
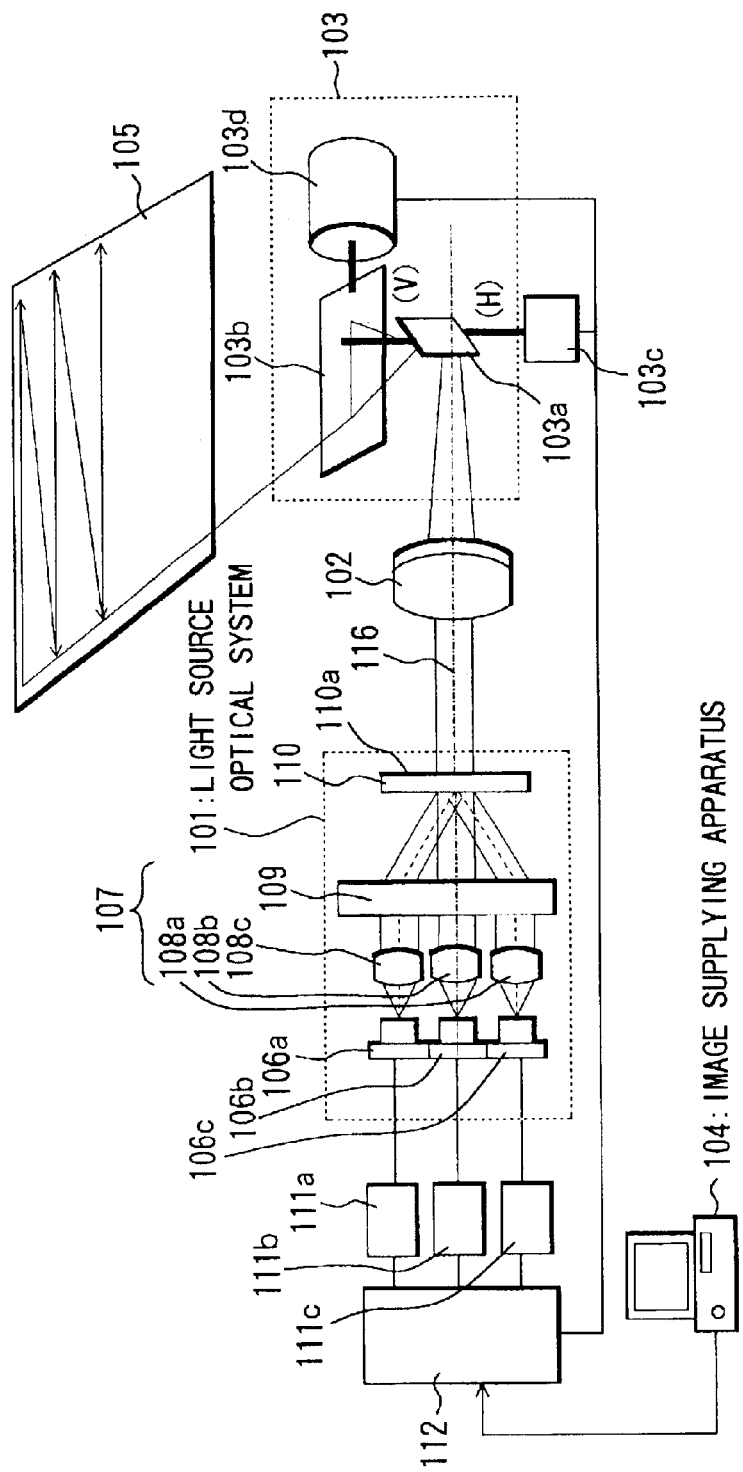
FIG. 1 is a drawing showing the structure of a scanning image display apparatus having a scanning type display optical system that is Embodiment 1 of the present invention.

FIG. 1 shows the structure of a scanning type image display apparatus that comprises a scanning type display optical system that is Embodiment 1 of the present invention.

This scanning type image display optical system comprises a light source optical system 101 combining a plurality of color beams of light and outputting the combined beam, a projection optical system 102 condensing the beam from the light source optical system 101, and a scanning optical system 103 having a horizontal scanning mirror 103a and a vertical scanning mirror 103b that scan the beam (condensed point), condensed by the projection optical system 102, in the horizontal direction and the vertical direction respectively on a screen 105.

The light source optical system 101 has light sources 106a, 106b, and 106c that emit three color light fluxes respectively. The light sources 106a, 106b, and 106c are connected to light source driving circuits 111a, 111b, and 111c respectively, and the light source driving circuits 111a, 111b, and 111c are connected to a control circuit 112. The control circuit 112 is also connected to actuators 103c and 103d that drive the horizontal scanning mirror 103a and vertical scanning mirror 103b respectively.

The control circuit 112 outputs modulating signals to the light source driving circuits 111a, 111b, and 111c according to an image signal inputted from an image supplying apparatus 104 such as a personal computer, a television set, a VTR, or a DVD player. Then, the light source driving circuits 111a, 111b, and 111c drive the light sources 106a, 106b, and 106c according to the inputted modulating signals so as to modulate the light emitted from the light source. An image display system is constituted by the scanning type image display apparatus and image supplying apparatus 104.

The three colors light fluxes emitted from the light sources 106a, 106b, and 106c become beams of light by passing through a collimating optical system 107 described later, and are combined into one beam by passing through a color combining diffraction optical element 110. This combined beam is condensed by the projection optical system 102 to enter into the horizontal scanning mirror 103a.

The horizontal scanning mirror 103a is driven by the actuator 103c so as to oscillate in the horizontal direction at high speed, and the beam reflected by the horizontal scanning mirror 103a enters into the vertical scanning mirror 103b. The vertical scanning mirror 103b is driven by the actuator 103d so as to oscillate in the vertical direction at high speed. Owing to this, the beam reflected by the vertical scanning mirror 103b is scanned on the screen 105 in the horizontal and vertical directions, and an image is displayed on the screen 105.

The light source optical system 101 will be described in further detail by using FIG. 2. Three light sources 106a, 106b, and 106c are semiconductor light sources such as laser diodes, or light emitting diodes (inorganic semiconductor light sources or organic semiconductor light sources) that generate light in different wavelength regions such as a red wavelength region (R) of 600 to 670 nm, a green wavelength region (G) of 500 to 570 nm, and a blue wavelength region (B) of 420 to 490 nm, and can directly modulate light emitted therefrom respectively.

Alternatively, light emitting devices that emit light fluxes having the above-described wavelength regions, each of which uses a second order harmonic generator (SHG), may be used as the light sources 106a, 106b, and 106c.

The light sources 106a, 106b, and 106c are arranged on a plane approximately orthogonal to a main optical axis 116.

Each of the three color light fluxes emitted from the light sources 106a, 106b, and 106c has divergence. Nevertheless, each of the light fluxes (113r, 113g, and 113b) emitted from the respective light sources 106a, 106b, and 106c is made to be approximately parallel light flux (beam of light: 113r', 113g', 113b') by the collimating optical system 107 comprising the collimating lenses 108a, 108b and 108c as first optical elements arranged independently on three color optical paths respectively, and a second optical element 109 arranged commonly to the three color optical paths. The beams 113r', 113g', and 113b' enter into the approximately same regions on the color combining diffraction optical element 110.

Figure 2:
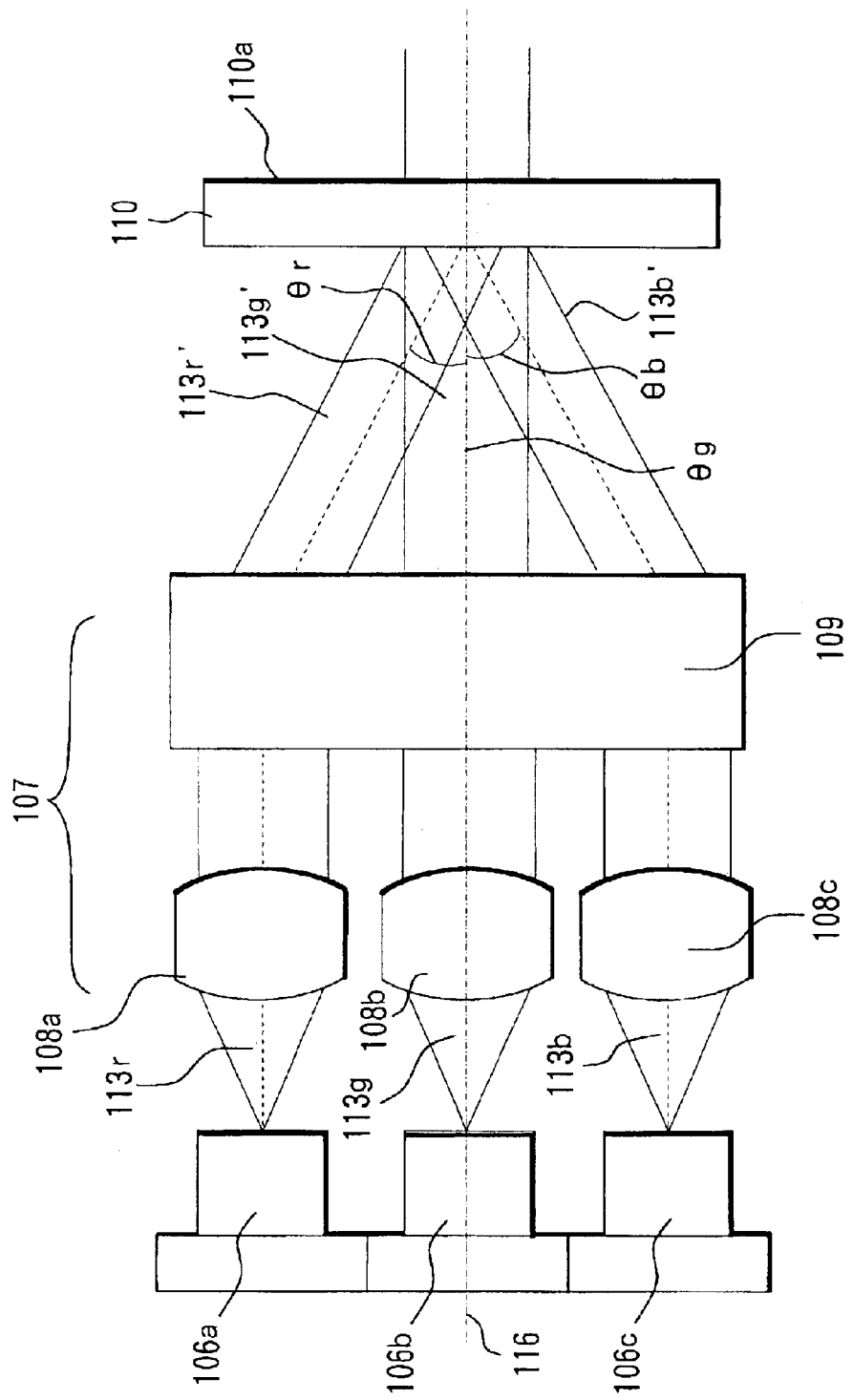
FIG. 2 is a drawing showing the structure of a light source optical system Embodiment 1.
Figure 3:
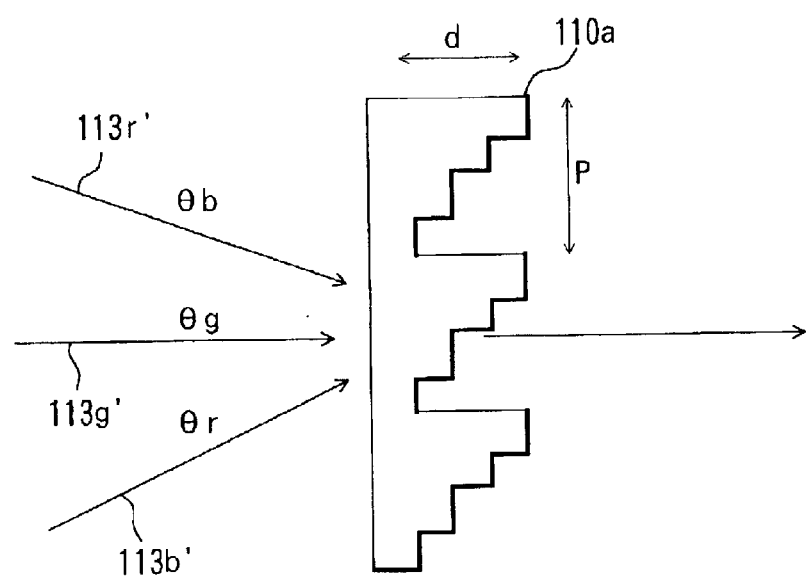
FIG. 3 is an enlarged sectional view of a color combining diffraction optical element used for the scanning type image display apparatus in Embodiment 1.

At this time, the respective beams 113r, 113g, and 113b have incident angles named θr, θg, and θb for the color combining diffraction optical element 110 as shown in FIGS. 2 and 3. As shown in FIG. 3, on an output surface (the right side in the figure) side of the color combining diffraction optical element 110, a diffraction grating 110a constituted by a plurality of step-wise grating portions 110a with height d which are arranged in a pitch (grating period) P, is formed.

Figure 10:
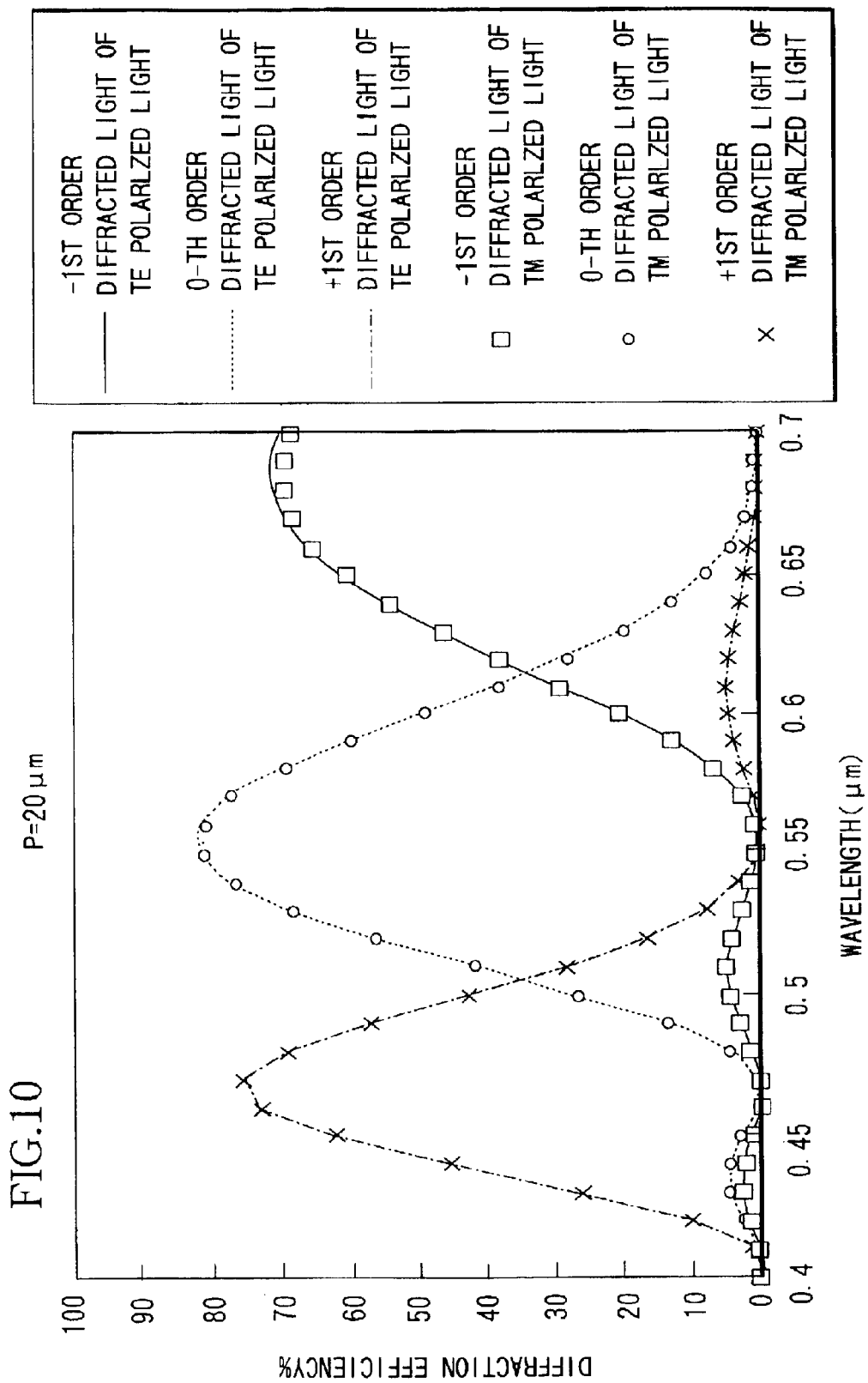
FIG. 10 is a graph showing the diffraction efficiencies of the color combining diffraction optical element (pitch: 20 μm) used for the scanning type image display apparatus in Embodiment 1.

FIG. 10 shows an example where setting is made so that diffraction efficiencies of light having diffraction orders corresponding to R, G, and B light sources become high at the grating pitch P=20 μm. The diffraction grating 110a of this embodiment has the structure that a diffraction order where a diffraction efficiency of an incident light becomes maximum varies according to a wavelength of the incident light.

Moreover, the grating pitch (grating period) P is determined so that the beams 113r', 113g' and 113b' incident on the color combining diffraction optical element 110 at θr, θg, and θb that are shown in FIG. 3 may have one optical path after being emitted.

Though diffraction efficiencies of respective polarization directions such as TE and TM, and respective diffraction orders are shown in FIG. 10, it is clear that setting is made so that respective diffraction efficiencies of R, G, and B may become high according to the diffraction order.

In this manner, since color composition (combination) is achieved by the color combining diffraction optical element 110 (diffraction grating 110a), it is not necessary to constitute a color combining system by using a plurality of dichroic mirrors conventionally. Hence, it is possible to reduce the number of parts.

In addition, since the diffraction grating 110a has a minute shape, the large volume of a dichroic prism is not needed. Therefore, it is possible to miniaturize the color combining diffraction optical element 110 itself. Thus, it is also possible to miniaturize the light source optical system 101.

Furthermore, though it is shown that the light source optical system 101 is divided into the collimating optical system 107 and color combining diffraction optical element 110 in this embodiment, it is possible to achieve the further miniaturization of the light source optical system 101 by integrating the collimating optical system 107, and color combining diffraction optical element 110.

Then, in this embodiment, since light flux having divergence from each of the light sources 106a, 106b, and 106c enters into the color combining diffraction optical element 110 after being collimated (being made approximately parallel light flux [beam]), it becomes possible to reduce the variation of an incident angle of a light beam from the same light source to the color combining diffraction optical element 110. Hence, it is possible to reduce the angular dependence of a diffraction efficiency.

Figure 4:
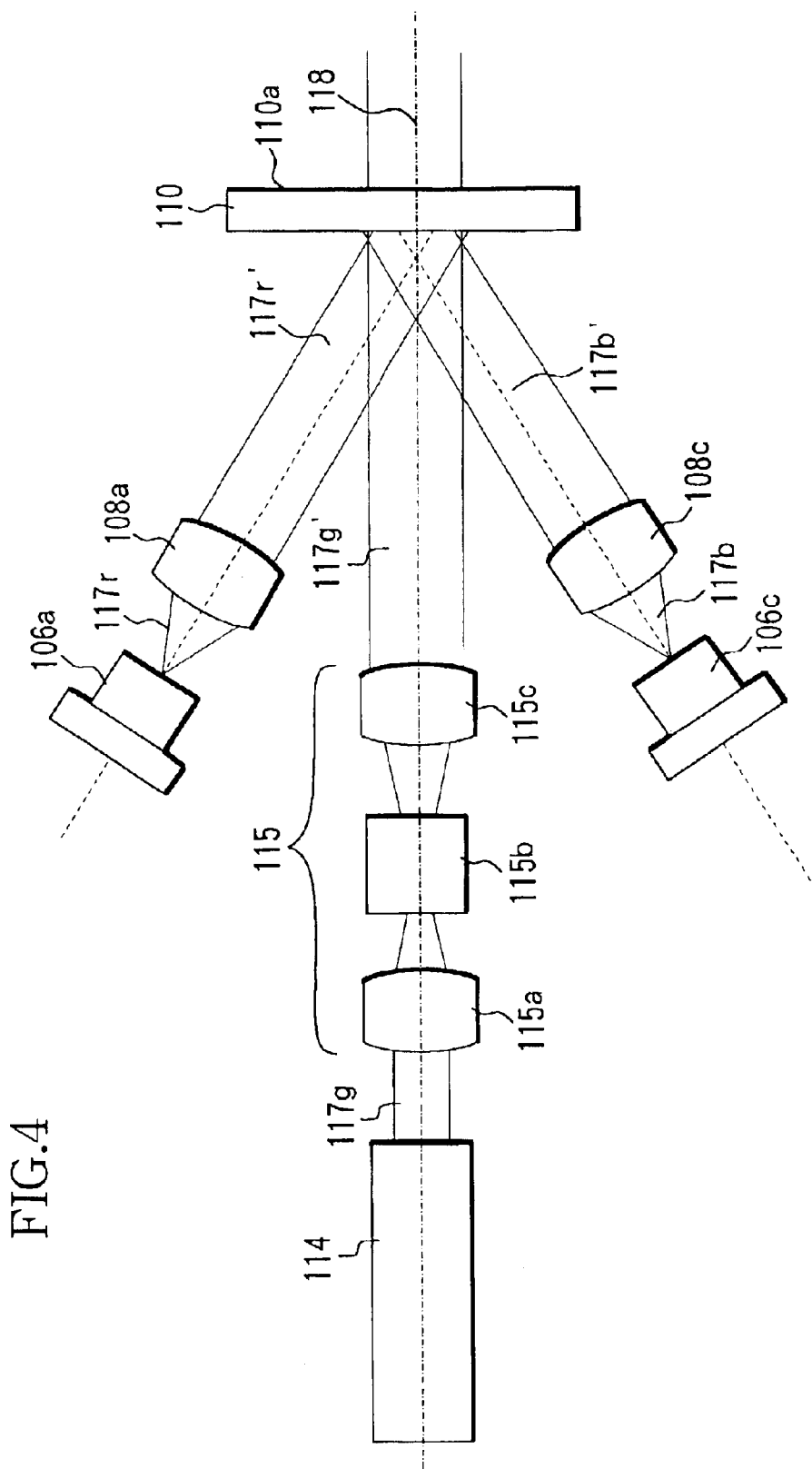
FIG. 4 is a drawing showing a modified example of the light source optical system in Embodiment 1.

FIG. 4 shows a modified example of the light source optical system 101 in the above-described Embodiment 1. Since the other structure of the scanning type image display apparatus is similar to the structure shown in FIG. 1, its explanation will be omitted.

The case that all of the three light sources 106a, 106b, and 106c are semiconductor light sources which can directly modulate light emitting therefrom, is described in the scanning type image display apparatus shown in FIG. 1. Nevertheless, in this modified example, two out of three light sources, the light sources 106a and 106c can directly modulate light emitting therefrom, and one, the light source 114 is a light emitting device that light emitted therefrom is modulated by an external modulation optical system 115.

The light sources 106a and 106c are semiconductor light sources that emit light fluxes 117r and 117b in a red wavelength region (R) and a blue wavelength region (B) respectively and can directly modulate the light fluxes 117r and 117b. The light fluxes (beams) enter into the color combining diffraction optical element 110 after being collimated by the collimating lenses 108a and 108c respectively. On the other hand, the light source 114 is a rare-gas laser source or a diode-pumped solid state laser source.

The light flux (beam) 117g emitted from the light source 114 enters into the modulation optical system 115. The modulation optical system 115 is constituted by condenser lenses 115a and 115c, and an acousto-optic modulator 115b. The acousto-optic modulator 115b is connected to a driving circuit not shown, and modulates and emits the beam 117g. Beams 117r', 117g', and 117b' emitted from the collimating lenses 108a, 108c and the condenser lens 115c and enter into the color combining diffraction optical element 110, are combining into one beam on a main optical axis 118.

In this modified example also, since light fluxes from the light sources 106a, 106c, and 114 enter into the color combining diffraction optical element 110 after being collimated, it becomes possible to reduce the variation of an incident angle of a light flux from the same light source on the color combining diffraction optical element 110. Hence, it is possible to reduce the angular dependence of a diffraction efficiency.

In addition, though the case that three beams are combined into one beam by the color combining diffraction optical element 110 is described in the above-described Embodiment 1, the present invention is not limited to this.

Though the collimating optical system 107 is constituted by the collimating lenses 108a to 108c and the second optical element 109 in this embodiment, the present invention is not limited to this. When structure can be performed so that each light flux may enter into the color combining diffraction optical element 110 in approximately parallel light flux, it is possible to obtain similar results. Moreover, it is possible to achieve miniaturization by having such structure that the collimating lens 108a to 108c and the second optical element 109 are integrated to play both actions.

Figure 5:
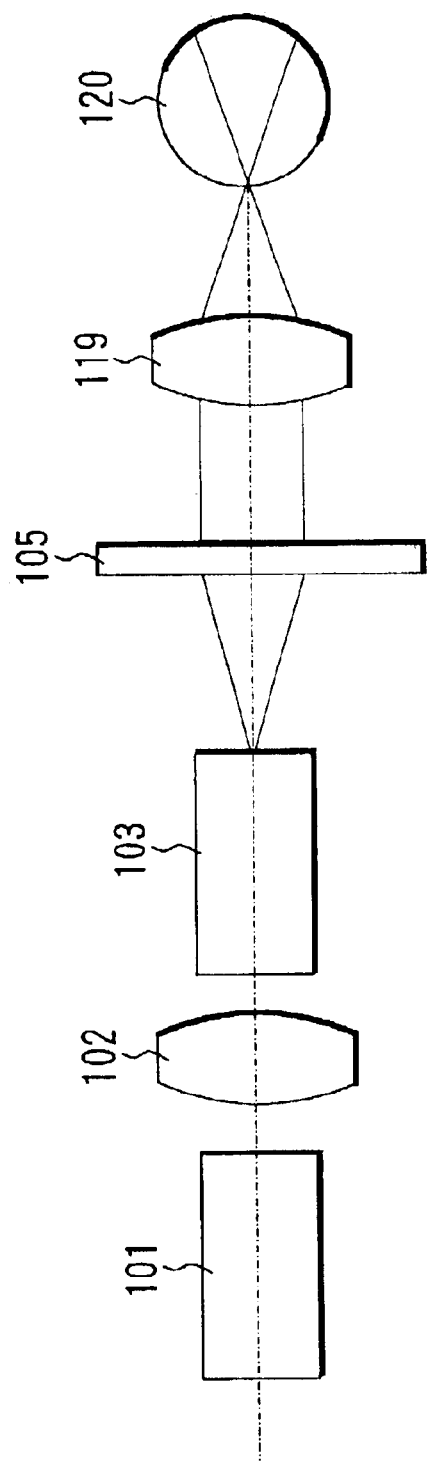
FIG. 5 is a drawing showing another application of Embodiment 1.

In addition, though the scanning type image display apparatus (scanning type display optical system) displaying an image on the screen 105 is shown in this embodiment, the present invention is not limited to this. It is also possible to have such structure that the size of the screen 105 is made small and an image is displayed by scanning light on the screen 105 similarly to this embodiment as shown in FIG. 5, and the image formed by the light scan is observed through an eyepiece optical system 119 by observer's eye 120. When being constituted in this manner, the image display optical system is consequently constituted so that light scanned on the screen 105 is scanned on the retina in the eye 120. This structure can apply to a head-mounted display apparatus, an electric view finder optical system etc.

In addition, though the case that a grating pitch of the color combining diffraction optical element is set as 20 $\mu$m is described in Embodiment 1, the present invention is not limited to this. Since a splitting angle of each diffraction order light becomes large when a grating pitch of a diffraction optical element is lessened, it becomes possible to avoid mechanical interference of light sources, and hence, it is possible to further miniaturize the entire apparatus.

Figure 11:
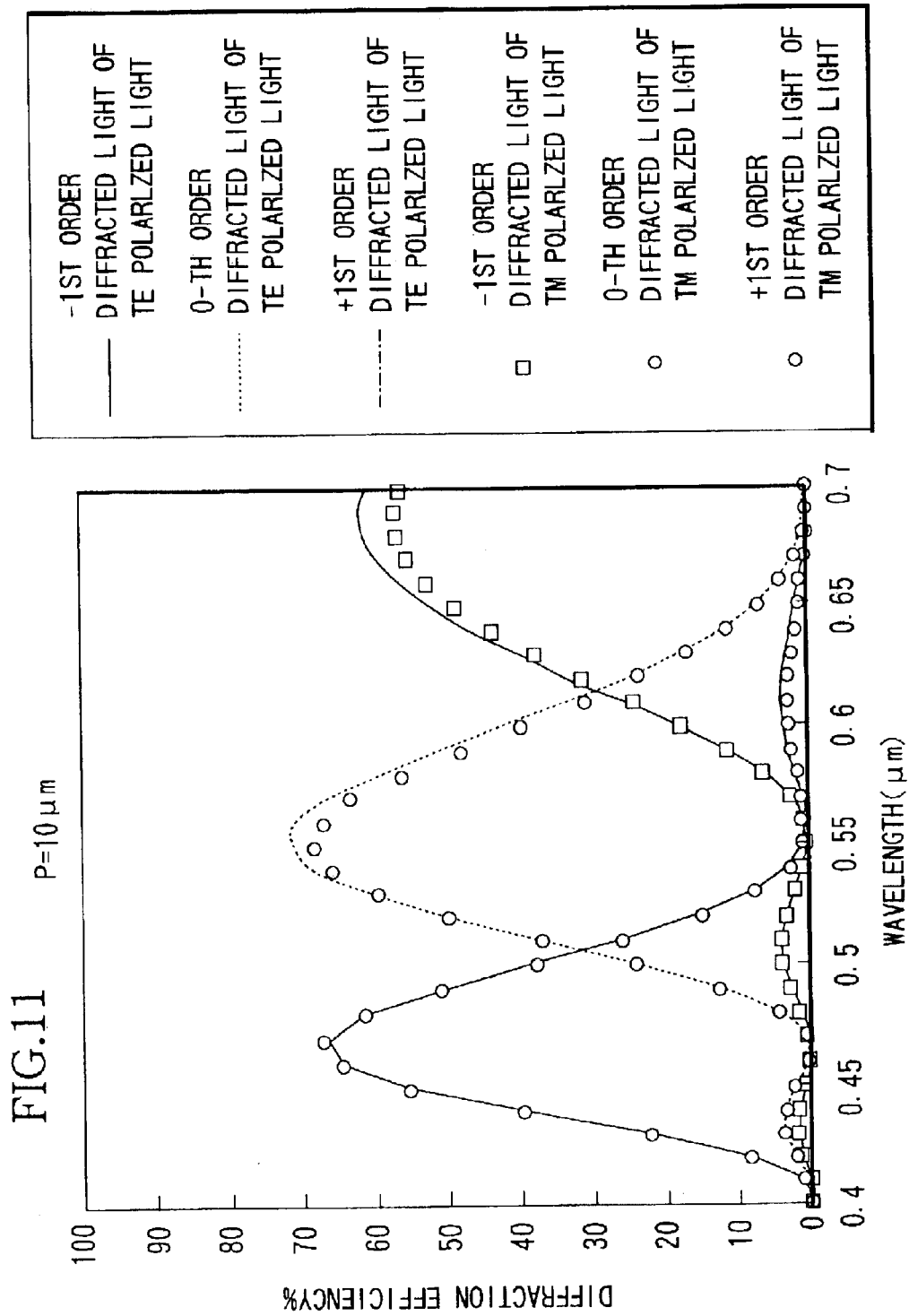
FIG. 11 is a graph showing the diffraction efficiency of the color combining diffraction optical element (pitch: 10 μm) used for the scanning type image display apparatus in Embodiment 1.

FIG. 11 shows the diffraction efficiency at the time when a grating pitch P is made to be 10 $\mu$m. In the case of 10 $\mu$m also, the diffraction efficiency in each wavelength region corresponding to a diffraction order shows comparatively high values. Nevertheless, it can be seen that the polarization dependence appears in the diffraction efficiency a little.

In a region where the polarization dependence appears in the diffraction efficiency in this manner, in the case that a light source emitting polarized light such as a semiconductor laser is used as a light source, it is effective to align the polarization direction with the direction where the diffraction efficiency of the diffraction optical element becomes high.

Figure 12:
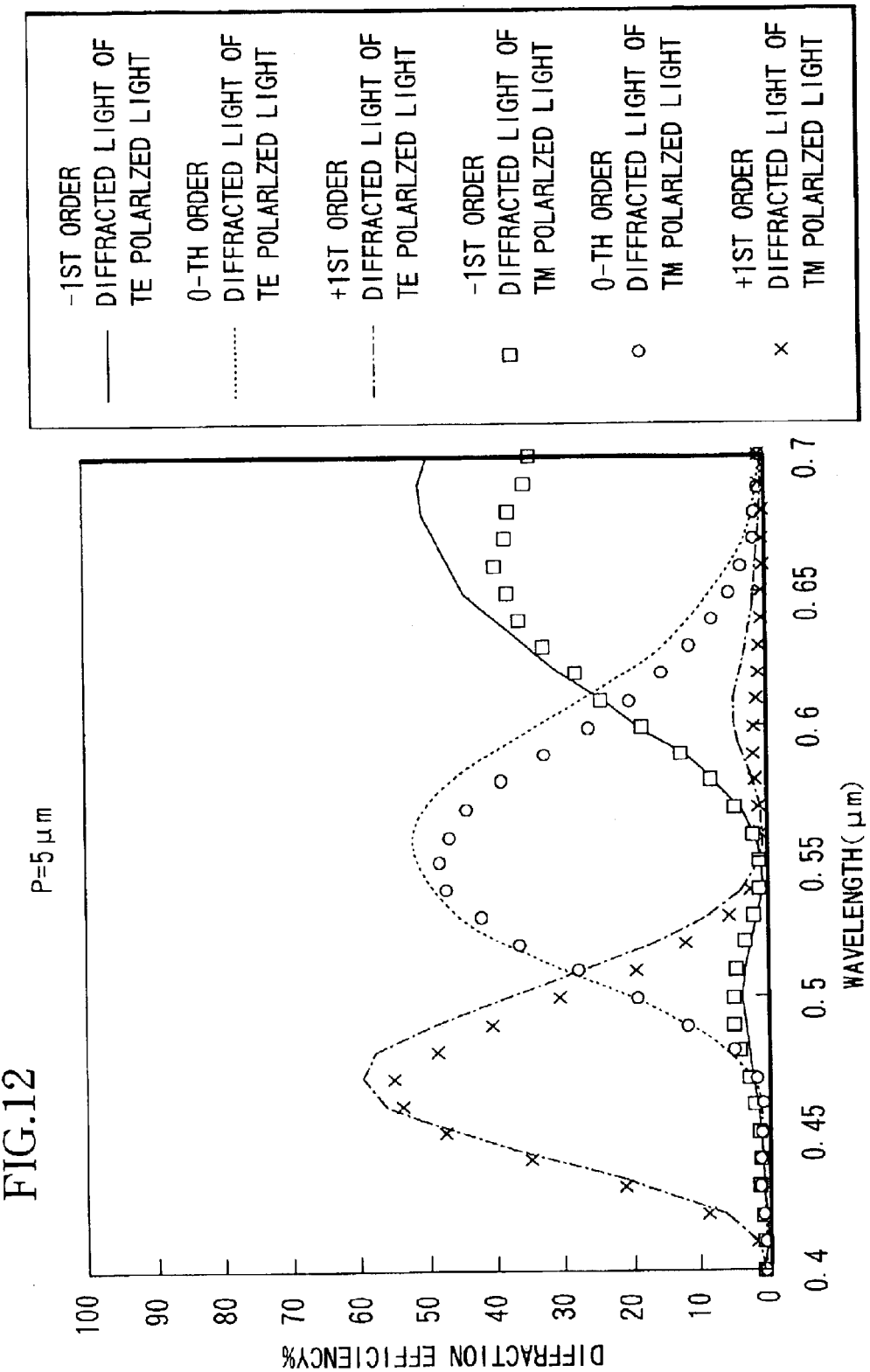
FIG. 12 is a graph showing the diffraction efficiency of the color combining diffraction optical element (pitch: 5 μm).
Figure 13:
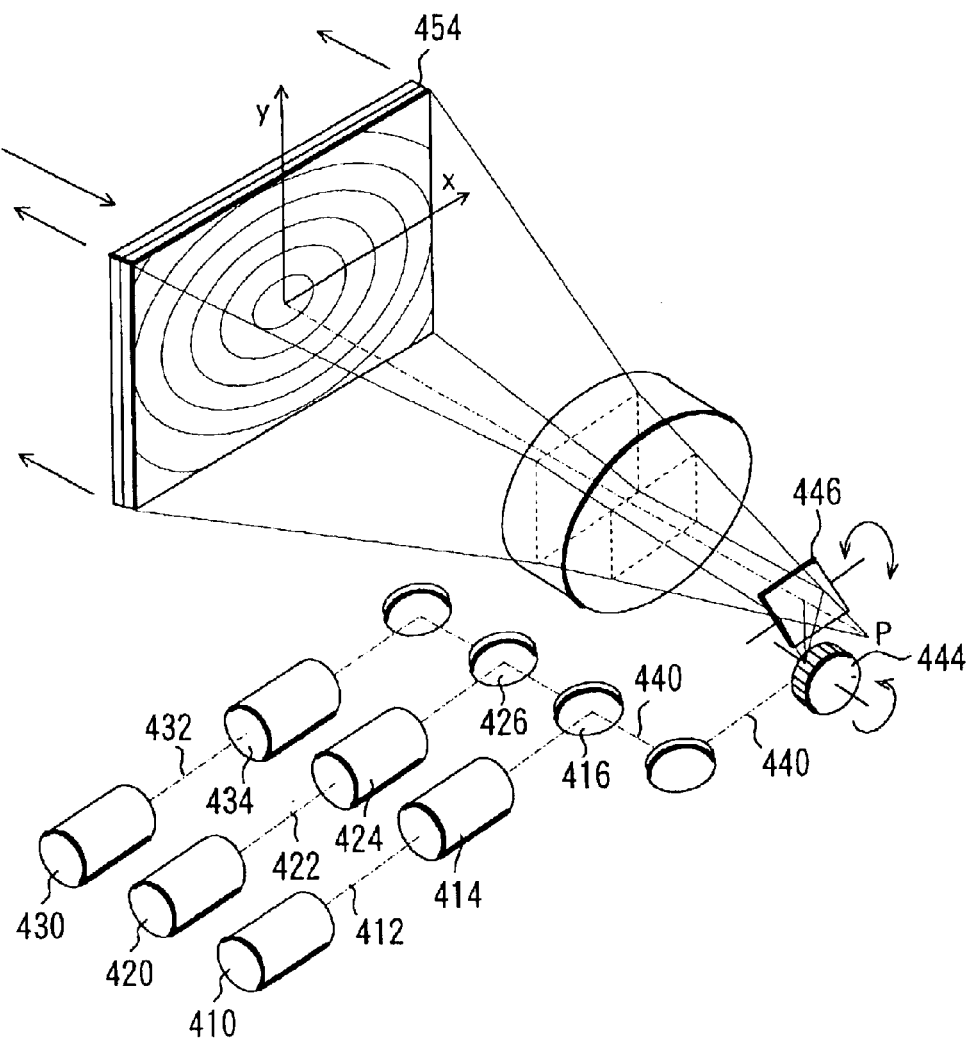
FIG. 13 is a drawing showing a conventional scanning type image display apparatus.
Figure 14:
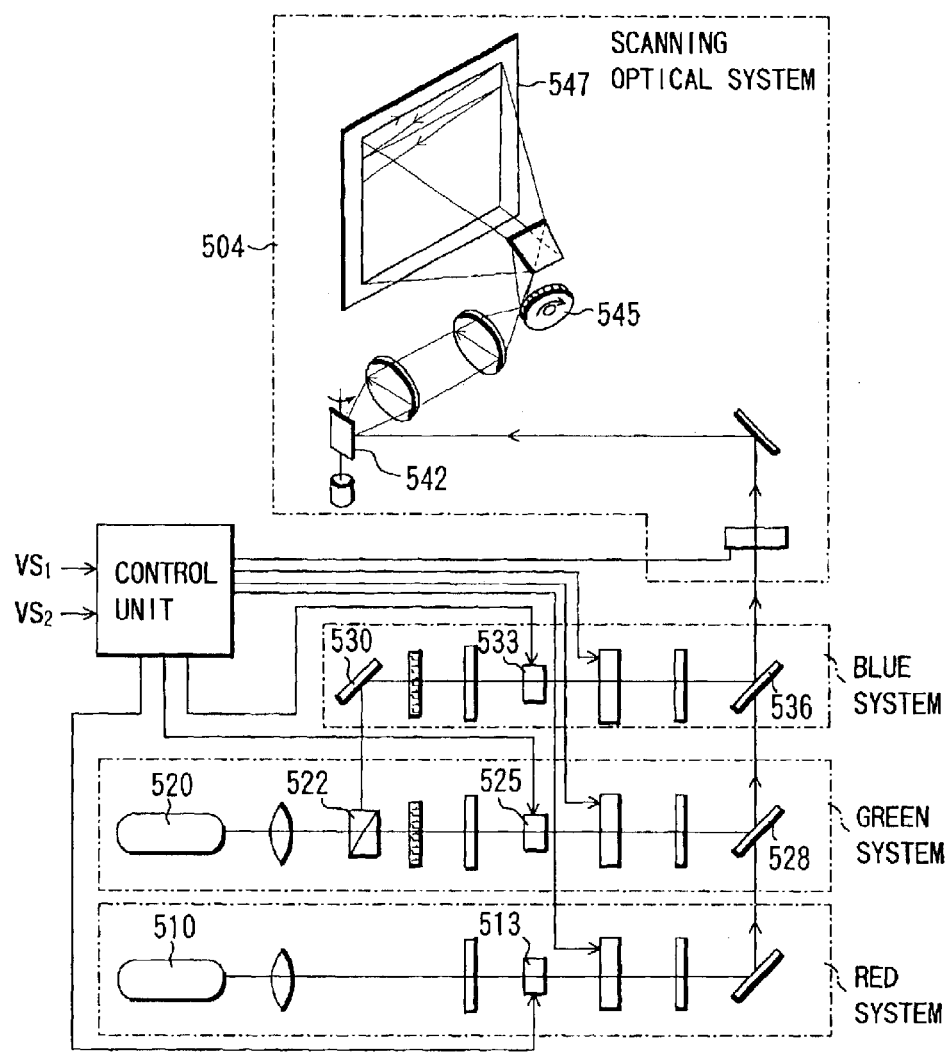
FIG. 14 is a drawing showing another conventional scanning type image display apparatus.

In addition, FIG. 12 shows the diffraction efficiency at the time of the grating pitch P=5 $\mu$m. It can be seen that the diffraction efficiency considerably drops in comparison with the cases shown in FIGS. 10 and 11. If the grating pitch is extremely reduced in this manner, it becomes difficult to obtain desired diffraction efficiency. Hence, it is desirable to make the grating pitch P 5 $\mu$m or more.

Embodiment 2

Figure 6:
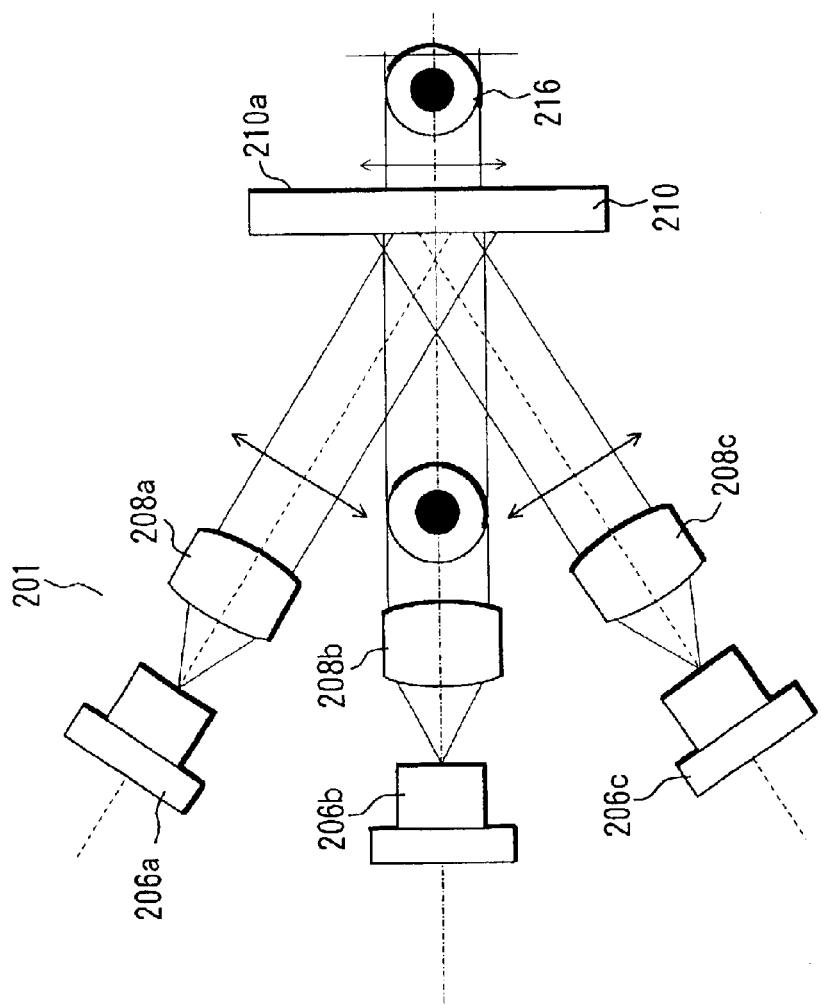
FIG. 6 is a drawing showing the structure of a scanning type image display apparatus having a scanning type display optical system in Embodiment 2 of the present invention.

FIG. 6 shows a light source optical system 201 in a scanning type image display apparatus that is Embodiment 2 of the present invention. Since the other components among those of the scanning type image display apparatus are similar to those in Embodiment 1, their explanation will be omitted.

Light sources 206*a*, 206*b*, and 206*c* are connected to a control circuit (refer to reference numeral 112 in FIG. 1) that drive these light sources 206*a*, 206*b*, and 206*c* respectively on the basis of an image signal inputted from the image supplying apparatus 104 shown in FIG. 1.

The light sources 206*a*, 206*b*, and 206*c* according to this embodiment are light sources, which emit polarized light fluxes, such as semiconductor laser diodes directly modulating an emitting light therefrom on the basis of the image signal. Arrows and double circles in FIG. 6 show polarized directions of the light fluxes from respective light sources.

The light sources 206*a*, 206*b*, and 206*c* emit light fluxes with wavelength regions corresponding to red, green, and blue respectively. These light fluxes having divergence are collimated respectively by collimating lenses 208*a*, 208*b*, and 208*c* and are combined by a color combining diffraction optical element 210.

Figure 7:
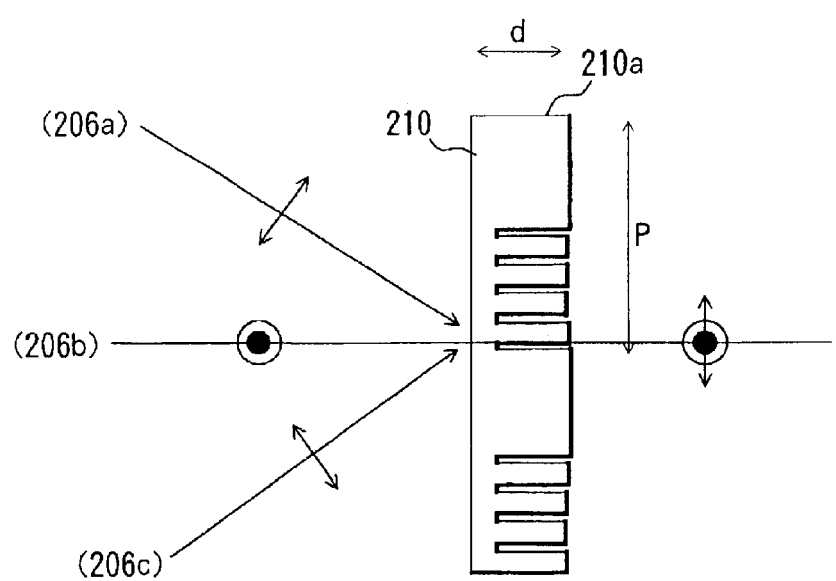
FIG. 7 is an enlarged sectional view of a color combining diffraction optical element used for the scanning image display apparatus in Embodiment 2.

As shown in FIG. 7, a diffraction grating 210*a* constituted by a plurality of grating portions with a pitch P and height d is formed on the outgoing surface side (the right side in the figure) of the color combining diffraction optical element 210. The pitch P is determined so that the three color light fluxes(beams of light) may be combined in one when the three color light fluxes (color light beams) having different incident angles are emitted.

The diffraction grating 210*a* in this embodiment uses structural birefringence. That is, this diffraction grating 210*a* does not exert a diffraction effect since acting as a zero-th order grating for a light flux (light flux from the light source 206*b*) having a polarized direction perpendicular (direction approximately parallel to a direction where the diffraction grating 210*a* is extended) to this paper surface of FIG. 7. Nevertheless, this diffraction grating 210*a* is designed so that diffraction efficiencies of the plus and minus first order (±1) diffracted light may become high for light fluxes (light fluxes from the light sources 206*a* and 206*c*) having a polarized direction parallel (approximately orthogonal to the direction where the diffraction grating 210*a* is extended) to this paper surface.

Then, it is possible in this embodiment to perform color composition (combination) by providing the light source 206*b* emitting the light flux that has the polarized direction where the diffraction effect is not exerted (of acting as the zero-th order grating) and the light sources 206*a* and 206*c* emitting the light fluxes with the polarized directions where the diffraction effect that makes them the plus and minus first order diffracted light is exerted, and using the polarization selectivity and diffraction effect of the color combining diffraction optical element 210. It is possible to use semiconductor laser diodes whose emitting light becomes polarized light, or light sources of each using a second harmonic generator (SHG) by using a semiconductor light source and a nonlinear optical crystal, respectively as the light sources 206*a*, 206*b*, and 206*c*.

Since color composition (combination) is performed by using the diffraction effect of the diffraction optical element 210 also in this embodiment. The number of parts and structure is simple. Furthermore, since the color composition is performed with a fine form that is a diffraction grating, miniaturization and lightening can be achieved.

Though semiconductor laser diodes etc. emitting polarized light are used as the light sources in this embodiment, it is possible to exert a similar effect by arranging a polarizer in each outgoing side of light sources even if they are light sources emitting unpolarized light.

Embodiment 3

Figure 8:
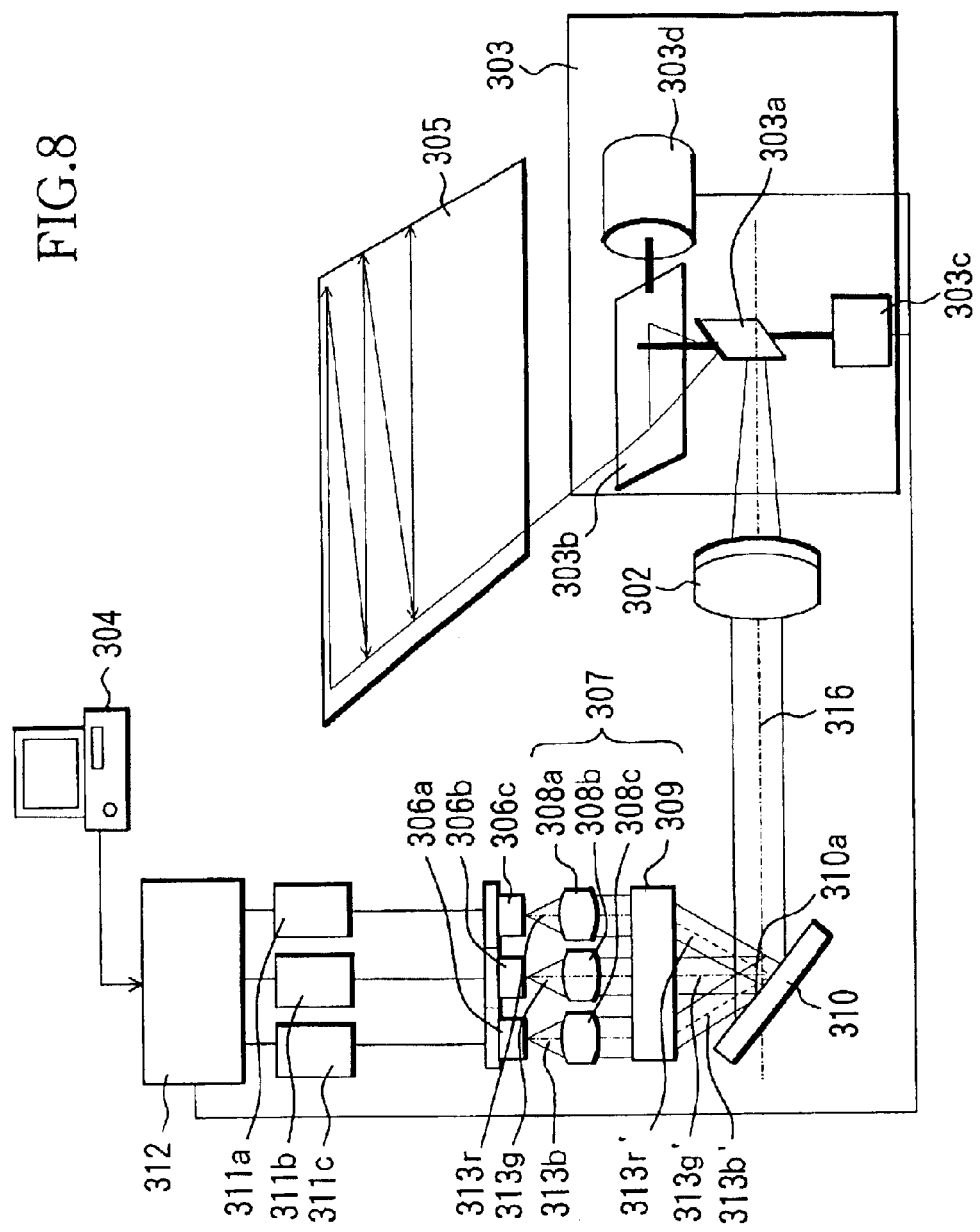
FIG. 8 is a drawing showing the structure of a scanning type image display apparatus having a scanning type display optical system in Embodiment 3 of the present invention.

FIG. 8 shows the structure of a scanning type image display apparatus having a scanning type display optical system that is Embodiment 3 of the present invention. This embodiment has the structure of condensing light, emitted from a light source optical system 301, on a screen 305 by a projection optical system 302. A scanning optical system 303 having a horizontal scanning mirror 303*a* and a vertical scanning mirror 303*b* is provided between the screen 305 and projection optical system 302. Then, it is possible to scan a condensed point of light on the screen 305 by driving the horizontal scanning mirror 303*a* and vertical scanning mirror 303*b* respectively driven by actuators 303*c* and 303*d*.

The light source optical system 301 has light sources 306*a*, 306*b*, and 306*c* that emit three color light fluxes respectively. The light sources 306*a*, 306*b*, and 306*c* are connected to light source driving circuits 311*a*, 311*b*, and 311*c* respectively. The light source driving circuits 311*a*, 311*b*, and 311*c* are connected to a control circuit 312. The control circuit 312 is also connected to the actuators 303*c* and 303*d* that drive the horizontal scanning mirror 303*a* and vertical scanning mirror 303*b* respectively.

The control circuit 312 outputs modulating signals to the light source driving circuits 311*a*, 311*b*, and 311*c* according to an image signal inputted from an image supplying apparatus 304 such as a personal computer, a television set, a VCR, or a DVD player. Then, the light source driving circuits 311*a*, 311*b*, and 311*c* drive light sources 306*a*, 306*b*, and 306*c* according to the inputted modulating signals so as to modulate the light emitted from the light sources. An image display system is constituted by the scanning type image display apparatus and image supplying apparatus.

The three color light fluxes emitted from the light sources 306*a*, 306*b*, and 306*c* become beams of light by passing through a collimating optical system 307 described later, and are combined into one beam by reflecting on a reflective color combining element 310. This combined beam is condensed by the projection optical system 302 to enter into the horizontal scanning mirror 303*a*.

The horizontal scanning mirror 303*a* is driven by the actuator 303*c* so as to oscillate in the horizontal direction at high speed, and the beam reflected by the horizontal scanning mirror 303*a* enters into the vertical scanning mirror 303*b*. The vertical scanning mirror 303*b* is driven by the actuator 303*d* so as to oscillate in the vertical direction at high speed. Owing to this, the beam reflected by the vertical scanning mirror 303*b* is scanned on the screen 305 in the horizontal and vertical directions, and an image is displayed on the screen 305.

The light source optical system 301 will be described in further detail. The three light sources 306*a*, 306*b*, and 306*c* are semiconductor light sources such as laser diodes, or light emitting diodes (inorganic semiconductor light sources or organic semiconductor light sources) that generate light in different wavelength regions such as a red wavelength region (R) of 600 to 670 nm, a green wavelength region (G) of 500 to 570 nm, and a blue wavelength region (B) of 420 to 490 nm, and can directly modulate light emitted therefrom. Alternatively, the three light sources may be light emitting devices that use wavelength conversion and are constituted so as to generate light in the above-described wavelength regions.

These light sources 306*a*, 306*b*, and 306*c* are arranged on a plane approximately orthogonal to a main optical axis 316.

The three color light fluxes 313*r*, 313*g*, and 313*b* emitted from the light sources 306*a*, 306*b*, and 306*c* have divergence. Nevertheless, each of these light fluxes 313*r*, 313*g*, and 313*b* is made to be approximately parallel light flux (beam of light: 313*r'*, 313*g'*, 313*b'*) by the collimating optical system 307 constituted of the collimating lenses 308*a*, 308*b*, and 308c as first optical elements arranged independently on three color optical paths respectively, and a second optical element 309 arranged commonly in the three color optical paths. The beams 313r', 313g', and 313b' enter into the approximately same regions on the reflective color combining diffraction optical element 310.

Figure 9:
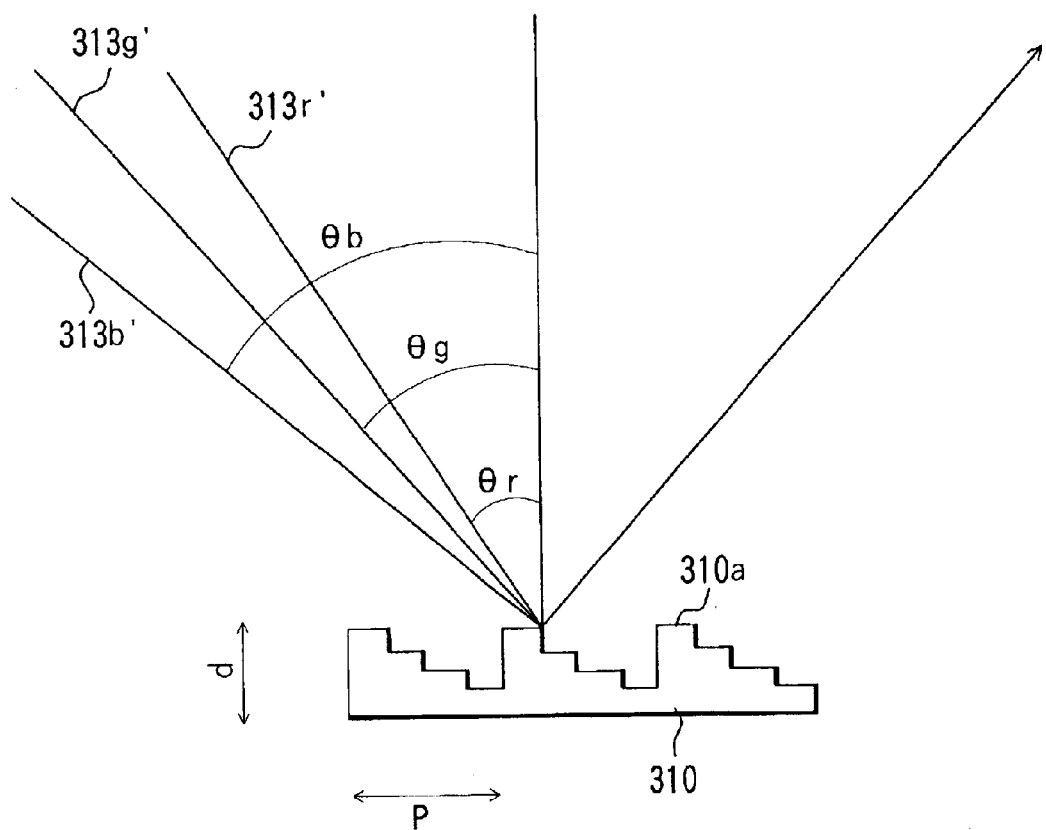
FIG. 9 is an enlarged sectional view of a color combining diffraction optical element used for the scanning type image display apparatus in Embodiment 3.

At this time, the respective beams 313r', 313g' and 313b' have incident angles named θr, θg, and θb for the color combining diffraction optical element 310 as shown in FIG. 9. On an incident surface (reflective surface) side of the color combining diffraction optical element 310, a diffraction grating 310a constituted by a plurality of step-wise grating portions with height d which are arranged at pitch P, is formed.

This diffraction grating 310a is set so that diffraction efficiencies of the zero-th order, minus first order, and plus first order diffracted light in different wavelength regions may become high. That is, the reflective color combining diffraction optical element 310 of this embodiment has the structure that a diffraction order where a diffraction efficiency of an incident light becomes maximum varies according to the wavelength of the incident light.

In addition, though characteristics of the diffraction grating 310a are fundamentally similar to those of the diffraction grating 110a of the color combining diffraction optical element 110 according to Embodiment 1 shown in FIGS. 10 and 11, height d is set so that the diffraction efficiency of reflection may become high. Furthermore, a reflecting surface is given reflection increase processing so that reflectance may become high.

Moreover, the grating pitch P is determined so that beams 313r', 313g' and 313b' entering into the color combining diffraction optical element 310 at incident angles θr, θg, and θb may combine into one beam after being emitted.

Since the color composition (combination) is achieved in this manner by the reflective color combining diffraction optical element 310 (diffraction grating 310a), it is not necessary to constitute a color combining system by using a plurality of dichroic mirrors as usual. Hence, it is possible to reduce the number of parts.

In addition, since the diffraction grating 310a has a minute shape, the large volume of a dichroic prism is not needed. Therefore, it is possible to achieve the miniaturization of the color combining diffraction optical element 310 itself.

In addition, since the reflective color combining diffraction optical element 310 is used in this embodiment, there is an advantage that it is possible to make a color combining diffraction optical element a thinner element so as to achieve an intra-element optical path difference being the same as that in the color combining diffraction optical element according to Embodiment 1. Moreover, since the reflective color composition diffraction optical element 310 uses the reflection of its surface, there is an advantage that utilization efficiency of light is high because of lesser absorption of light by material.

Furthermore, though it is shown that the light source optical system 301 is divided into the collimating optical system 307 and color combining diffraction optical element 310 in this embodiment, it is possible to achieve the further miniaturization of the light source optical system 301 by integrating the collimating optical system 307, and color combining diffraction optical element 310.

Then, in this embodiment, since each of the light fluxes having divergence from the light sources 306a, 306b, and 306c enters into the color combining diffraction optical element 310 after being collimated (being made approximately parallel light flux [beam]), it becomes possible to reduce the variation of an incident angle of a light flux from the same light source to the color combining diffraction optical element 310. Hence, it is possible to reduce the angular dependence of a diffraction efficiency.

In addition, it becomes impossible to obtain a desired diffraction efficiency due to the occurrence of the polarization dependence similarly to Embodiment 1 if the grating pitch P of the reflective color combining diffraction optical element 310 according to this embodiment is excessively reduced. Therefore, it is more effective to consider the polarization dependence of a color combining diffraction optical element and the polarization characteristic of light sources.

Though the scanning type image display apparatus (the scanning type display optical system) displaying an image on a screen is shown in this embodiment, the present invention is not limited to this. As described in Embodiment 1, by reducing the size of a screen, then forming an image by light scan on this screen and then being observed the formed image by observer's eyes through an optical system such as eyepieces, the scanning type image display optical system is constituted so that light may be scanned in an observer's retina. It is possible to apply such structure to a head-mounted display apparatus, an electric view finder optical system, etc.

In addition, though the collimating optical system 307 is constituted by the collimating lenses 308a to 308c and the second optical element 309 in this embodiment, the present invention is not limited to this. When structure can be performed so that each beam may enter into the color combining diffraction optical element 310 in approximately parallel light, it is possible to obtain similar results. Moreover, it is possible to achieve further miniaturization by having such structure that the collimating lens 308a to 308c and the second optical element 309 are integrated to play both actions.

As described above, according to each embodiment described above, since a diffraction optical element is used as an element that combines a plurality of color light fluxes, it is possible to reduce the number of parts in comparison to the case that a plurality of dichroic mirrors is used. Furthermore, it is possible to achieve the miniaturization of an entire optical system since it is also not necessary to provide a large-scale optical path route. In addition, since a diffraction effect by a single diffraction optical element is used, it is easy to secure desired optical performance in comparison to the case of using a dichroic prism which has a plurality of polarization splitting surfaces, and moreover, it is possible to constitute this at low cost.

While preferred embodiments have been described, it is to be understood that modification and variation of the present invention may be made without departing from the sprit or scope of the following claims.

What is claimed is:

1. A scanning type display optical system, comprising:
   a plurality of light sources emitting light having wavelength regions mutually different;
   a light combining element combining a plurality of light emitted from the light sources; and
   a scanning optical system scanning the light, combined by the light combining element, on a scan surface,
   wherein the light combining element is a diffraction optical element.

2. The scanning type display optical system according to claim 1, wherein a polarized direction of light emitted from at least one light source of the plurality of light sources is approximately parallel in a direction where the diffraction grating is extended in the diffraction optical element, and a polarized direction of light emitted from the other light sources is approximately orthogonal to the direction where the diffraction grating is extended in the diffraction optical element.

3. The scanning type display optical system according to claim 1, wherein the diffraction optical element makes a plurality of light, which enters into the diffraction optical element at mutually different angles, to be a plurality of diffracted light having mutually different diffraction orders.

4. The scanning type display optical system according to claim 3, wherein each of the light sources emits light having divergence, and a collimating optical system that makes each light flux emitted from the light sources an approximately parallel light flux, is arranged between the light sources and the diffraction optical element.

5. A scanning type image display apparatus, comprising:

the scanning type display optical system according to claim 4, wherein each of the light sources emits light in a visible light wavelength region that is different from others.

6. The scanning type display apparatus according to claim 5, wherein a grating period in the diffraction optical element is 5 $\mu$m or more.

7. An image display system, comprising:

the scanning type image display apparatus according to claim 6; and an image supplying apparatus supplying an image signal for modulating light emitted from each of the light sources to the scanning type image display apparatus.

* * * * *